Figure 1:
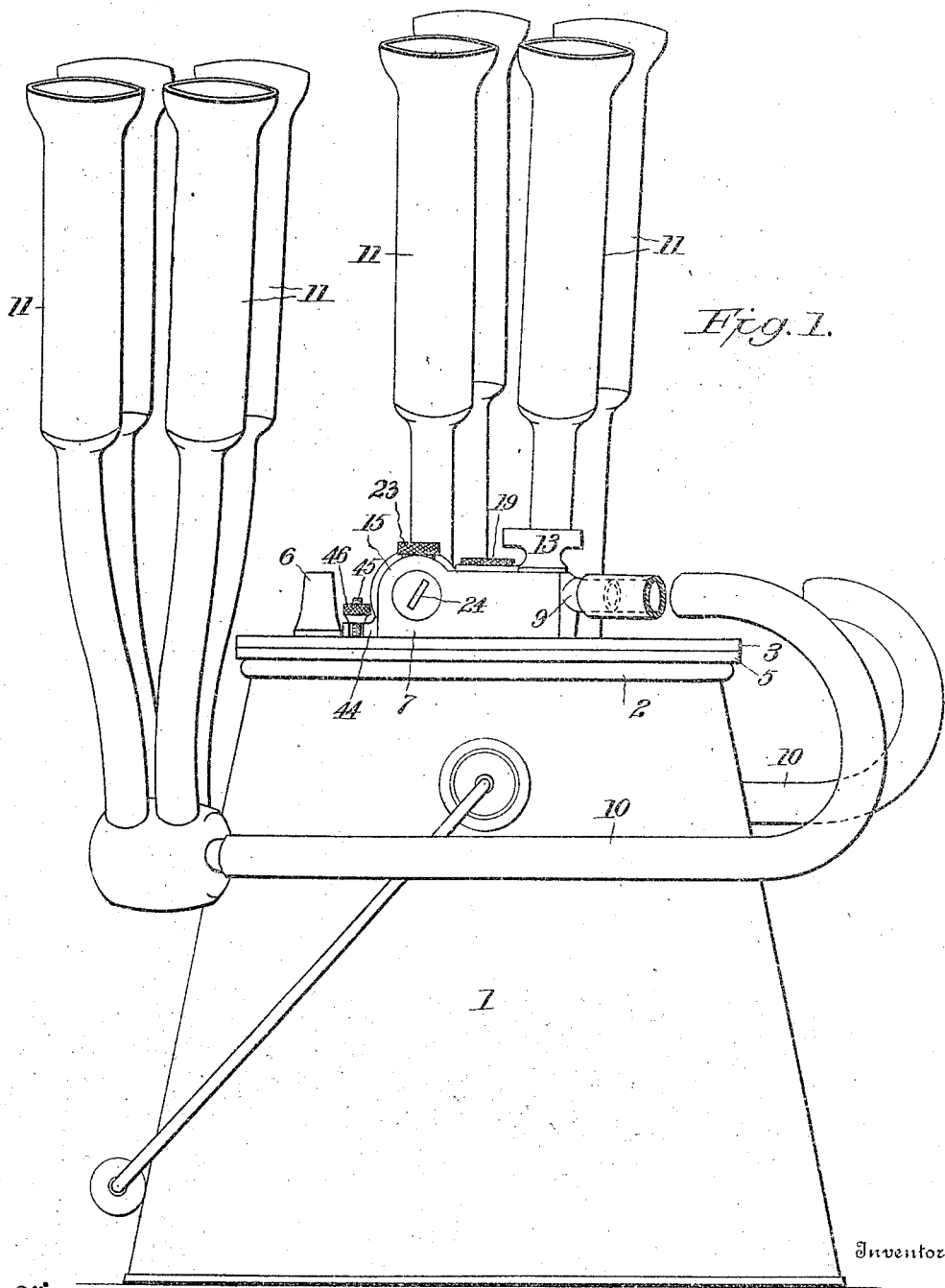

F. E. NEWELL.
COW MILKING MACHINE.
APPLICATION FILED MAY 27, 1907.

1,030,010.

Patented June 18, 1912.
3 SHEETS—SHEET 1.

Witnesses
C. N. Wacker
E. Binnell

Inventor
Fred Elton Newell
by W. W. Finnell
Attorney

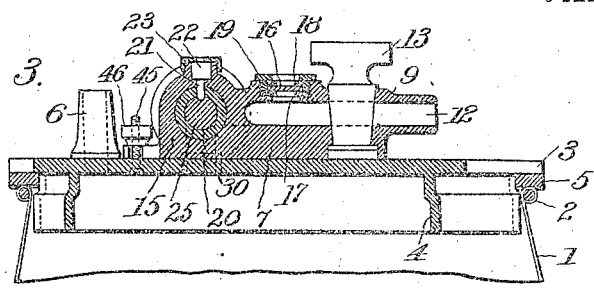
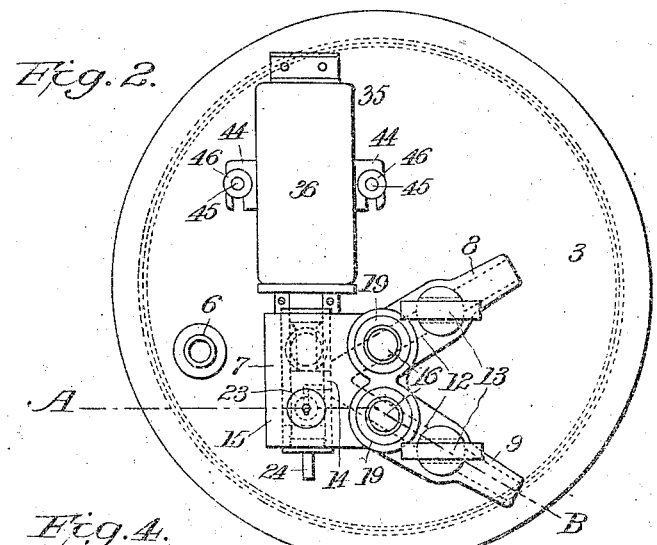
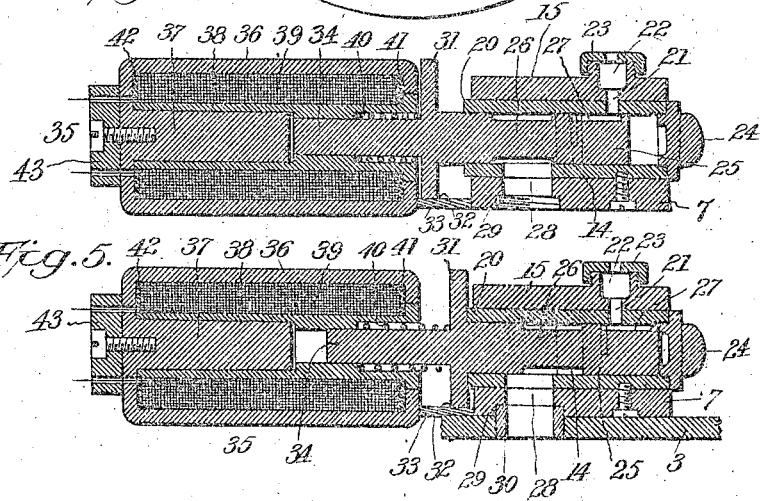

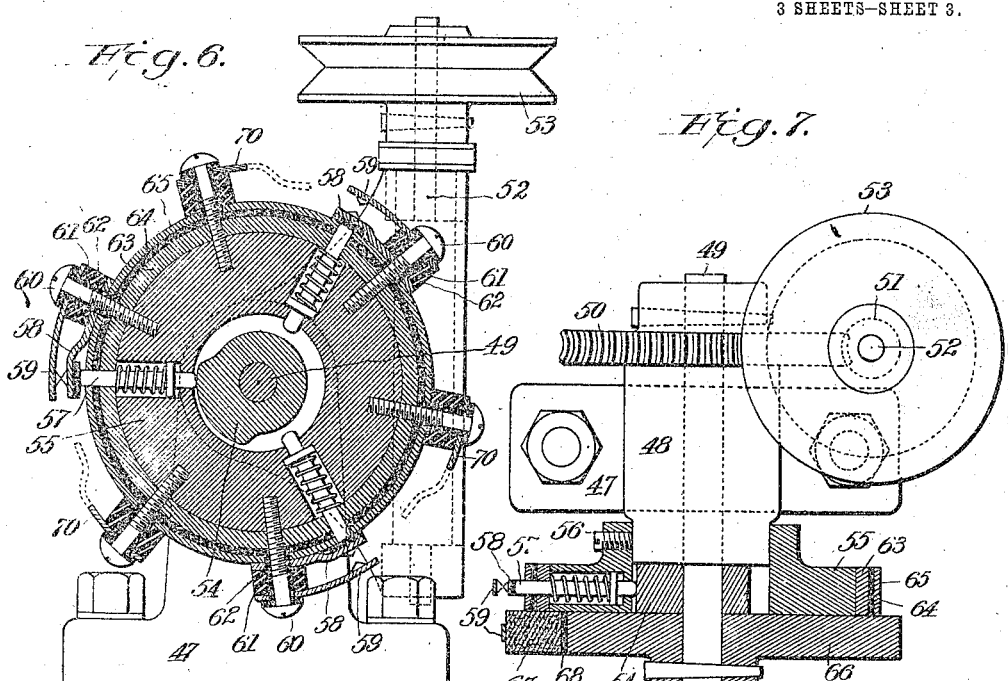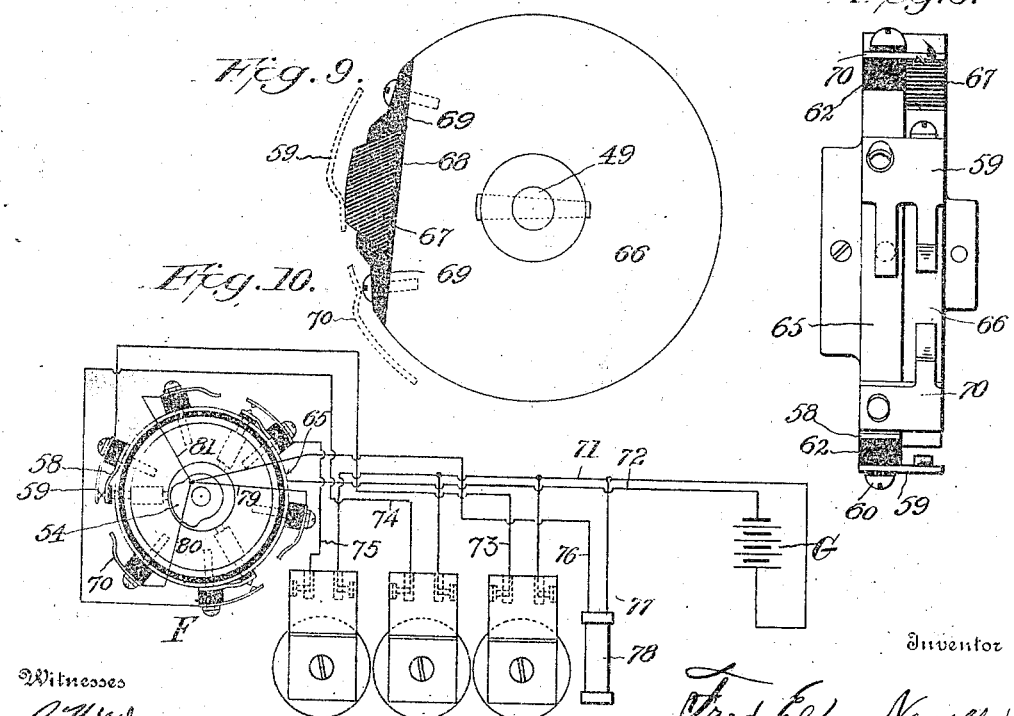

UNITED STATES PATENT OFFICE.

FRED ELTON NEWELL, OF WESTMINSTER, VERMONT, ASSIGNOR TO VERMONT FARM MACHINE COMPANY, OF BELLOWS FALLS, VERMONT, A CORPORATION OF VERMONT.

COW-MILKING MACHINE.

1,030,010.  Specification of Letters Patent.  Patented June 18, 1912.

Application filed May 27, 1907. Serial No. 376,015.

*To all whom it may concern:*

Be it known that I, FRED ELTON NEWELL, a citizen of the United States, residing at Westminster, in the county of Windham and State of Vermont, have invented a certain new and useful Improvement in Cow-Milking Machines, of which the following is a full, clear, and exact description.

This invention relates to that class of cow milking machines in which vacuum suction and air at atmospheric pressure are combined and controlled in such way as to simulate the ordinary manual action in drawing the milk.

In the present invention, the milk receptacle is utilized as such and also as a vacuum chamber, and each milk receptacle of any number of a series of receptacles connected with a common vacuum source, has upon its cover a pulsator which is operated to control the vacuum and air pressure in such way as to produce the simulation of manual milking. The pulsator has two milk channels connected with appliances for milking two cows, and these two channels open into a single port communicating with the interior of the milk receptacle, and the pulsator is arranged to operate simultaneously to open and close communication, through this port, with the two aforesaid channels.

In the preferred construction, the pulsator is operated electrically, through the intervention of a solenoid, or other suitable electro-magnetic agent, automatically controlled. The piston of the pulsator carries the armature and may be extended as the movable core of the electro-magnet or solenoid.

In the accompanying drawings, illustrating the invention, in the several figures of which like parts are similarly designated, Figure 1 is an elevation of a milk receptacle, the pulsator, the solenoid, and a pair of sets of teat cups. Fig. 2 is a top plan view of the cover. Fig. 3 is a section taken substantially in the plane of line A—B, Fig. 2. Fig. 4 is a longitudinal section of the pulsator and solenoid, showing the parts in position with the milk receptacle port open to the atmosphere. Fig. 5 is a similar longitudinal section, but showing the parts in initial milking position and with the atmospheric communication closed. Fig. 6 is an elevation and partial vertical section of an electrical interrupter or make-and-break device, for use in the electrical installation for operating the pulsators. Fig. 7 is a plan view and partial section of said interrupter. Fig. 8 is an end elevation of the contacts, their holding plate and the auxiliary cam of the interrupter. Fig. 9 is a side elevation of the auxiliary cam of the interrupter. Fig. 10 is a diagrammatic view representing the electric installation as applied to three pulsators, the auxiliary cam being omitted.

1 is the milk receptacle, having the rim 2, and the cover 3, said cover, as shown in Fig. 3, having a flange 4. Between the rim 2 and cover 3 is interposed a gasket or packing-ring 5 of any suitable material capable of making an air-tight joint between the cover and the rim of the receptacle. The cover is provided with a nipple 6 for connection with a suction apparatus for creating a vacuum in the receptacle. Fixedly mounted on the cover is a casting 7, having branches 8 and 9, each of which is adapted to receive a tube 10 extending from the teat-cups 11, which may be of ordinary construction. These branches are provided with channels 12, in which are interposed the cut-off cocks or plug valves 13, and these two channels 12 converge and open in a common port 14, made in the cylindrical portion 15 of the casting 7. Each of the branches 8 and 9 is provided with an observation glass 16 placed between the packing-rings 17 and 18 and held in place by an annular screw-cap 19 in such way that the interior of the milk channels 12 may be visible at all times, in order to inspect the progress of the milking. The cylindrical portion 15 is bored out to receive a bushing or lining 20, and the port 14 extends through this bushing. Another port 21 is made in the cylinder and opens to the atmosphere through a filter-chamber 22 and a perforated cap 23. One end of the bushing is screw threaded and provided with a removable cap 24.

25 is a piston, having the reduced portion 26 to coöperate with the port 14, and having an L-shaped groove 27 to open communication between the air port 21 and the port 14. Port 14 communicates through port 28 in the cylinder with the milk receptacle. The port 28 is counterbored at 29 to receive a coupling-piece 30, (see Fig. 5), by which the casting 7 is rigidly attached to the cover 3. Any additional fastenings may be used as required. The piston 25, outside of the cylinder 15, has a flange 31 which, as will presently appear, forms the armature of the electro-magnet, and the lower portion of this flange is slabbed off at 32, so as to move over a wear-plate 33 fast on the cover, to prevent the piston from rotating, or, in other words, to keep the groove 27 in alinement with the air port 21 and port 14. The piston is extended beyond this armature 34, and this extension becomes the movable core of the electro-magnet or solenoid, herein designated 35. The preferred electro-magnet is a solenoid, composed of the casing 36, of magnetic material, having the fixed core 37 preferably constructed integrally therewith and extending within a sleeve 38, which is surrounded by the winding 39. The metallic casing 36 completely surrounds the winding 39 and covers both ends of the electro-magnet or solenoid and thereby increases the attractive power of the magnet, and furthermore produces a practically liquid-tight solenoid which will not be injured by milk when used for the purpose of this invention and in other places where exposed to moisture or fluids. The extension 34 of the piston enters the sleeve 38 and is therein surrounded by the spring 40, which serves to retract the armature and piston when the current is cut out or broken and the magnet deënergized. The wire is insulated at 41 and 42 from the ends of the casing 36. 43 is a block of insulating material on the end of the solenoid which may be provided with binding-screws to receive the terminals of the solenoid winding, and to which the circuit wires may be connected in order to include the solenoid in electric circuit. The solenoid may be secured to the cover in any suitable manner, as by slotted ears 44, set-screws 45, and nuts 46, and by this construction the solenoid may be adjusted to the throw of the piston, if desired.

For present purposes, the piston, its cylinder, and milk connections, its air connections and its milk receptacle connections may be considered as the pulsator, herein referred to. For purposes of the present invention, wherein an electric current from any suitable source is used to operate the pulsator, it is necessary that some automatic device for interrupting or periodically making and breaking the electric circuit should be used. One such automatic arrangement is illustrated in detail in its application in Figs. 6, 7, 8, 9 and 10, and consists of a stand 47, having a bearing 48 for a shaft 49. This shaft 49 is provided with a worm-wheel 50, which meshes with a worm 51 on a shaft 52 supported by the stand, and this shaft 52 has a band-wheel 53 for transmitting motion through the worm-wheel to the shaft 49 and its attached parts. The shaft 49 has attached to it a cam 54, arranged within an opening in a contact-holder plate 55, secured to the bearing 48, as by a set-screw 56. This plate 55 is pierced radially to receive as many spring-retracted pins 57 as there are distributing circuits to be operated. In the instance shown, three such pins and circuits are illustrated, and these pins are operated successively by the cam 54. Each pin works beneath the spring-metal contact-piece or brush 58, coöperating with the contact-piece or brush 59, and these two contact-pieces 58 and 59 for each spring pin are secured to the plate 55 by an insulated screw or other fastening device 60, surrounded by an insulating sleeve 61, and the contact-pieces 58 and 59 are separated from each other by the insulating block 62, and the pins and contact-pieces 58 are insulated from one another. The plate 55 is encircled by a segmental metal ring 63, and this ring is encircled by a segmental insulating ring 64, and the latter by an incoming current distributing ring 65. Mounted upon and turning with the shaft 49 is a plate 66, having secured to its periphery an auxiliary cam-tip 67 preferably of carbon, and insulated from the plate by the sheet 68, and detachably held on the plate by the clamps 69, preferably of insulating material.

The contact-piece 59, as shown in Fig. 8, is extended laterally to overlap the plate 66, so that the auxiliary cam-tip 67 comes into contact therewith. The plate 55 has also mounted upon it the contact-pieces 70, insulated therefrom in substantially the same way that the contact-pieces 58 and 59 are insulated, and these contact-pieces 70 extend over into the path of movement of the auxiliary cam-tip 67, as shown in Fig. 8. The contact-pieces 58, in operation, subserve the purpose of connections for the main circuit through the circuit distributing ring 65, and the contact-pieces 59 subserve the purpose of connections for the out-going circuits; and the contact-pieces 70 subserve the purpose of brushes or connections for a circuit leading to an unloading or resistance coil.

Referring to the diagrammatic view, Fig. 10, C, D and E represent the solenoids of three several pulsators on as many different milk receptacles; F represents the automatic interrupter or make-and-break device last previously described, and G represents a source of electrical supply which may be a battery or any other suitable electric generator. 71 and 72 are the wires from the generator. 73, 74 and 75 are the wires to the respective solenoids C, D and E. 76 is the leading-in wire, and 77 is the return wire to the resistance or kick coil 78. These several wires are connected up in circuit with the interrupter or make-and-break device F, substantially as shown.

Not shown, but of any approved construction, in the installation, is a vacuum tank with the necessary apparatus to maintain a practically constant vacuum, and leading from this tank is a main vacuum pipe having branches extending to each station where the cows are to be milked, and each branch ending in a valve having a nipple or other hose connection at 6, with each independent vacuum milk receptacle. If only one cow is to be milked at each milk receptacle, then the other teat cup connections are closed by turning the cock 13 therein. The electrical apparatus being in action, the pulsator will be operated thereby, and a partial vacuum will be produced in each of the milk receptacles, and the piston of the pulsator will assume the position shown in Fig. 5, in which there is a free communication with the milk receptacle through the passages 28 and 14 into the vacuum and milk passages or channels 12, and thence to the teat cups. The suction caused by the vacuum will act upon the teat cups to draw the milk, and this milk-drawing action is maintained for a short period, and then by means of the interrupter or make-and-break device, the circuit is closed and the solenoid is energized and the armature 31 attracted and the piston 25 moved over to the position shown in Fig. 4, which cuts off the communication previously described. It is to be noticed that when the piston has thus cut off the communication, the vacuum continues in all of the branches between the teat cups and the port 14 until the air port 21 has been opened sufficiently to admit atmospheric air, and upon this admission of atmospheric air, the vacuum is reduced and the teat cups relax their hold or drawing action on the teats and the milk stops flowing; whereupon a short period of rest ensues, not sufficient, however, to entirely destroy the vacuum before the interrupter again acts and breaks the circuit and thus deënergizes the solenoids. When thus deënergized, the springs 40, which are compressed by the attraction of the armature, are free to expand, and thereby force the piston back to its initial position, shown in Fig. 5, at which time the vacuum action again becomes fully active. These periods of suction and rest alternate at regular predetermined intervals with great accuracy and certainty, as the process of drawing the milk continues.

The operation of the described interrupter may be thus briefly described. Power is applied to the pulley 53 by means of a belt from any suitable power connection and the worm on its shaft engaging the worm-wheel 50, rotates the cam shaft 49 and the cam 54 thereon, and this cam coming into contact with one of the pins 57, moves said pin outwardly against the stress of its spring and brings the contact-pieces 58 and 59 into electrical contact. The contact-pieces 58 are in electrical contact with the incoming current distributing ring 65 connected with the feeding wire 72, and the contact-pieces 59 are connected with the out-going circuit wires leading to the pulsators and the return wire. The contact-pieces or brushes 70 are connected up by wires 79, 80 and 81 with the wire 76, leading to the resistance or kick-coil 78.

Referring to the diagram, Fig. 10, which shows the contact-pieces 58 and 59 at the left, in electrical contact, the circuit would be from the generator through the wire 72 and the interrupter to the solenoid C. When the stroke of the cam 54 is nearly completed, the auxiliary cam-tip 67 has made contact between the overlying finger of the contact-piece 59 and the unloading brush 70, thereby making a circuit from said contact-piece 59 around through the brush 70 and the wire 76 through the resistance of kick-coil 78. The path of this circuit is closed just before the action takes effect which opens the circuit between the contact-pieces 58 and 59, thereby preventing sparking between the contacts 58 and 59. These series of actions occur as each of the spring pins 57 is acted upon by the cam 54 in its revolution. The interrupter thus subserves the two-fold purpose of interrupting the current leading to the several solenoids, so that any desired number of pulsations of the pulsator may be obtained within a given time, both with respect to duration of partial vacuum and period of rest or air admission, and employing a relatively small electric generator, because of the different circuits making a constant load thereon.

In the installation of the apparatus, the wires for the circuits of the several milk receptacles and their pulsators may be incased in a cable or other suitable conduit, and the milking receptacles and their pulsators connected by suitable branch wires leading from the main circuit wires; and it is obvious that any number of milk receptacles with their respective pulsators, say one, two or three, may be included in a single branch circuit, preferably in parallel. That is to say, the circuits may be so arranged that if twelve machines were used in a single installation, with a three point interrupter, as herein shown, four of the machines would be included in a single branch circuit and would be drawing on the generator at one time, and by this arrangement, it is possible to use a generator of very small dimensions, and consequently the power for operating the pulsators is correspondingly less.

What I claim is:—

1. In a milking machine, a vacuum milk receptacle, a cover therefor, a pulsator fixed on said cover and having vacuum, milk and air passages, and a sliding piston extending outwardly and constituting the movable core of an electro-magnet and having a disk thereon forming an armature for said electro-magnet, in combination with said electro-magnet.

2. In a milking machine, a vacuum milk receptacle, a cover therefor, a pulsator fixed on said cover and having vacuum, milk and air passages, and a sliding piston extending outwardly and constituting the movable core of an electro-magnet and having a disk thereon forming an armature for said electro-magnet, said disk squared off at its bottom to prevent the piston from turning, in combination with an electro-magnet.

3. In a milking apparatus, a vacuum milk receptacle, an air and milk passage for said receptacle, an electro-magnetically operated pulsator for controlling said air and milk passage, an electric generator, electric connections between said electric generator and said pulsator, a circuit interrupter included in said connections for making and breaking the circuit to said pulsator, and a resistance coil interposed between said circuit interrupter and the generator for unloading the current from the interrupter contacts when the circuit is broken.

4. In a milking apparatus, a series of vacuum milk receptacles, milk and air passages for said receptacles, electro-magnetically operated pulsators for controlling said milk and air passages, an electric generator, a series of circuits connecting said electro-magnetically operated pulsators with said generator, and a circuit interrupter included in said circuits for making and breaking the circuits to said pulsators successively.

5. In a milking apparatus, a series of vacuum milk receptacles, milk and air passages for said receptacles, electro-magnetically operated pulsators for controlling said milk and air passages, an electric generator, a series of circuits connecting said electro-magnetically operated pulsators with said generator, a circuit interrupter included in said circuits for making and breaking the circuits to said pulsators successively, and a resistance coil interposed between the interrupter and the generator for unloading the current from the interrupter contacts when the circuits are broken.

6. In a milking machine, the combination with a vacuum milk receptacle, a pulsator for said receptacle having vacuum, milk and air passages, and a piston for controlling said passages, of a solenoid for operating said piston, comprising a sleeve, a winding for said sleeve, and a magnetic casing for said winding extending over the ends thereof.

7. In a milking machine, a vacuum milk receptacle, a cover therefor, a pulsator fixed on said cover and having vacuum, milk and air passages, and a sliding piston extending outwardly and constituting the movable core of a solenoid and having a disk thereon forming an armature for said solenoid, in combination with said solenoid.

8. In a milking machine, a pulsator whose piston is prolonged to form the movable core of a solenoid, in combination with such solenoid and a retracting spring within the chamber of such solenoid.

9. In a milking machine, a vacuum milk receptacle, a pulsator for said receptacle comprising a cylinder having vacuum, milk and air passages, a piston arranged in said cylinder for controlling said vacuum, milk and air passages and extending through one end of said cylinder, and a screw-cap for closing the other end of said cylinder.

10. In a milking machine, the combination with a vacuum milk receptacle, a pulsator for said receptacle having vacuum, milk and air passages and a piston for controlling said passages, of a solenoid for operating said piston, comprising a sleeve, a winding for said sleeve, and a magnetic casing for said winding.

11. In a milking machine, a vacuum milk receptacle, a pulsator for said receptacle having vacuum, milk and air passages, and a piston for controlling said passages having an extension forming the movable core of a solenoid, combined with a solenoid sleeve, a winding for said sleeve, and a magnetic casing for said winding extending over the ends thereof.

12. In a milking machine, the combination with a vacuum milk receptacle, a pulsator therefor having vacuum, milk and air passages, and a piston for controlling said passages, of a solenoid for operating said piston, comprising a sleeve, a winding for said sleeve, and a magnetic casing for said winding extending over the ends thereof and provided with a fixed core extending within said sleeve at one end, and a projection on said piston adapted to enter the other end of said sleeve and constituting a movable core for said solenoid.

13. In a milking machine, the combination with a vacuum milk receptacle, a pulsator therefor having vacuum, milk and air passages, and a piston for controlling said passages, of a solenoid for operating said piston, comprising a sleeve, a winding for said sleeve, and a magnetic casing for said winding extending over the ends thereof, and provided with a fixed core extending within said sleeve at one end, a projection on said piston adapted to enter the other end of said sleeve and constituting a movable core for said solenoid, and a flange on said piston constituting an armature for the solenoid.

In testimony whereof I have hereunto set my hand this 23d day of May A. D. 1907.

FRED ELTON NEWELL.

Witnesses:
R. O. BIDWELL,
F. C. HILDRETH.